United States Patent [19]
Lincoln et al.

[11] Patent Number: 4,506,806
[45] Date of Patent: Mar. 26, 1985

[54] ANIMAL LIQUID LURE DISPENSER

[75] Inventors: Clark N. Lincoln, Alma; Norman L. Benzing, Big Rapids, both of Mich.

[73] Assignee: North American Outdoors, Inc., Alma, Mich.

[21] Appl. No.: 427,755

[22] Filed: Sep. 29, 1982

[51] Int. Cl.³ ............................................. A01K 15/00
[52] U.S. Cl. ................................... 222/175; 119/29.5
[58] Field of Search ................. 251/DIG. 4, 122, 346; 222/175; 604/251; 401/205, 6, 136–139, 48, 193; 119/29.5

[56] References Cited

U.S. PATENT DOCUMENTS

| | | | |
|---|---|---|---|
| 664,791 | 12/1900 | Stow | 401/289 |
| 1,833,402 | 11/1931 | Mundis | |
| 2,462,689 | 2/1949 | Stretz | 119/159 |
| 2,560,381 | 7/1951 | Babingron | 224/5 |
| 2,684,787 | 7/1954 | Charpiat | 222/175 |
| 2,707,068 | 4/1955 | Williamson | 222/175 |
| 2,959,354 | 11/1960 | Beck | 119/29.5 X |
| 3,171,412 | 3/1965 | Braun | 604/251 X |
| 3,572,558 | 3/1971 | Hooker | 222/420 |
| 3,804,592 | 4/1974 | Garbe | 21/121 |
| 3,900,184 | 8/1975 | Burke | 251/6 |
| 3,941,283 | 3/1976 | Garbe | 222/187 |
| 3,977,568 | 8/1976 | Smith | 222/80 |

Primary Examiner—Stanley H. Tollberg
Attorney, Agent, or Firm—Miller, Morriss & Pappas

[57] ABSTRACT

An animal liquid lure dispenser for dispensing lures such as doe urine includes a lure container and an elongate lure flow tube which leads to a lure flow regulator. The regulator is adjustable between a flow stopping setting and one or more fixed flow settings which permit a constant lure flow rate out of the regulator. The dispenser is designed so that the user wears or carries the container with the regulator being at or near ground level.

3 Claims, 9 Drawing Figures

ANIMAL LIQUID LURE DISPENSER

BACKGROUND OF THE INVENTION

1. Field of the Invention

The present invention relates to a liquid dispenser, and, more particularly, to an animal liquid lure dispenser.

2. Description of the Prior Art

Liquid animal lures which rely on particular scents to attract particular animals are well known. The use of these liquid lures is especially popular among hunters to attract their prey. For example, in hunting for deer, it is well known that doe urine is an especially effective lure for attracting bucks. Thus, the hunter applies a trail of the lure leading to his blind or place of hiding.

While these lures are effective, they are frequently very expensive. Because of the high cost, most hunters are very careful to avoid overly generous applications of the lure. In addition, since it is important to leave a generally continuous trail of scent, care must be taken to avoid substantial gaps in the scent trail during the application procedure.

The most common means for dispensing the liquid lures is a conventional plastic squeeze bottle with a nozzle top. The hunter squeezes the bottle to apply drops of the lure as he walks along the desired trail. Maintaining the desirable application rate while walking through the woods or along a trail can be a tedious chore for the hunter. Too generous of an application can quickly result in an empty bottle. On the other hand, too frugal of an application can result in substantial gaps in the scent trail thereby rendering the exercise ineffective. On windy days, the drops are randomly blown which increases the difficulty of providing a consistent scent trail.

Thus, most hunters would welcome a dispenser for liquid animal lures which is easy to use, which provides a continuous scent trail and which avoids the expense of overgenerous applications.

SUMMARY OF THE INVENTION

According to the present invention there is provided a dispenser for animal liquid lures which automatically dispenses liquid lure at a pre-determined flow rate and which dispenses the lure at or near ground level to provide the desired scent trail. The dispenser is easy to use and overcomes the problems of the prior art dispensers of inconsistency of flow rate and random dispersing of the lure on a windy day.

The unique lure dispenser includes a lure container having vent means in the upper portion thereof and lure egress means in the lower portion thereof. An elongate lure flow tube leads from the lure container to a lure flow regulator which is adjustable between a flow stopping setting and one or more fixed flow settings which permit a constant lure flow rate out of the distal end of the regulator. In a preferred embodiment, the lure flow tube is removable from the lure egress means of the container and replacable by a closure member to permit easy transport and storage of the lure container without leakage.

The preferred regulator includes a housing and a valve member, one of the housing and the valve member being in liquid flow communication with the distal end of the flow tube, and the housing and valve member being in adjustable liquid flow communication with each other to permit liquid flow out of the distal end of the regulator. Preferably, the housing has an axial bore therethrough with a valve seat portion, and the valve member has an axial bore from one end thereof to a point intermediate the other end thereof with at least one side port in liquid flow communication with the valve bore and the housing bore. The other end of the valve member is received in the housing bore and is engagable with the housing bore valve seat portion to stop liquid flow through the regulator. Sealing means are provided at the bore end of the valve member to prevent liquid flow between the housing bore and the valve member except through the valve side port when the valve member is disengaged from the valve seat portion of the housing bore. In the especially preferred embodiment, the valve member is a needle valve and the valve seat portion is a needle valve seat, and the housing and the needle valve are threadably engaged with each other so as to be adjustable between a flow stopping setting and one or more fixed flow settings.

The lure flow tube should be long enough so that the flow regulator is at or near ground level when the container is carried or worn by the user. Preferably, a tail flow tube is provided in flow communication with the distal end of the regulator to drag along the ground during application of the lure.

DETAILED DESCRIPTION OF PREFERRED EMBODIMENTS

Figure 1:
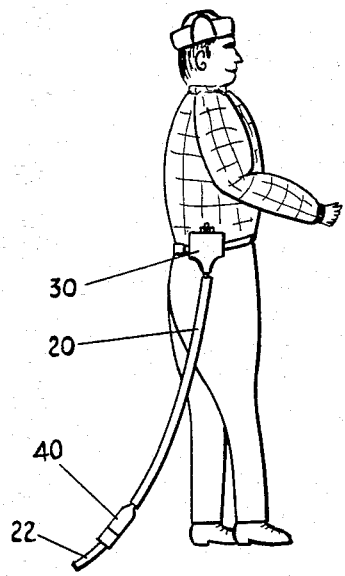
FIG. 1 is a perspective view of the animal lure dispenser of the present invention in use with the flow tubes and regulator proportionately enlarged for clarity.
Figure 2:
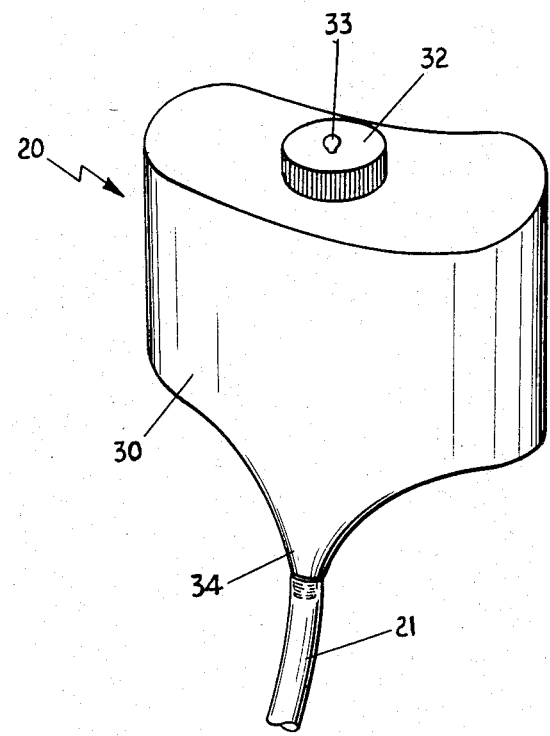
FIG. 2 is an enlarged perspective view of the lure dispenser.
Figure 3:
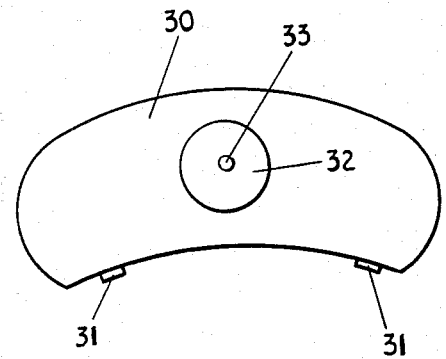
FIG. 3 is a plan view of the dispenser container.
Figure 4:
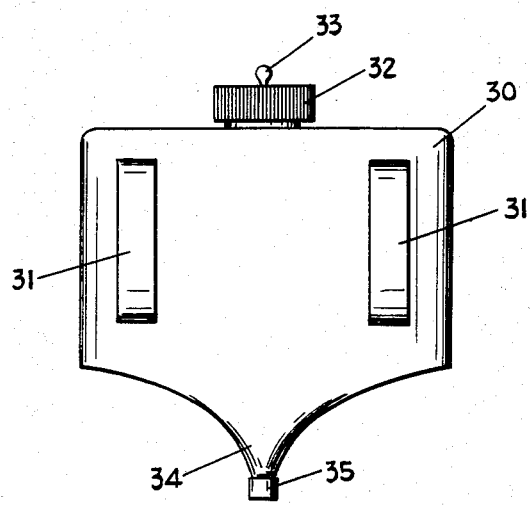
FIG. 4 is a back elevational view of the dispenser container.
Figure 5:
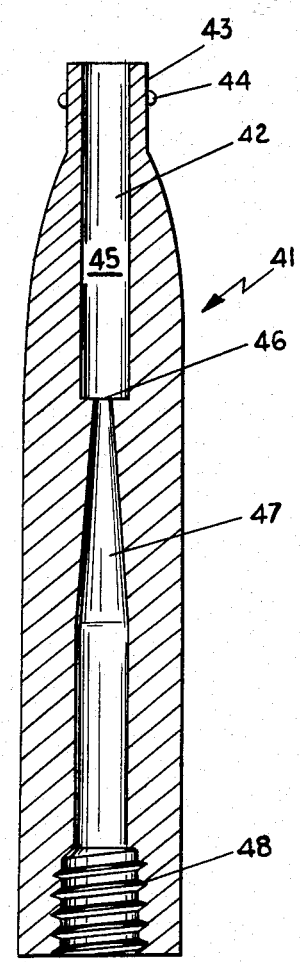
FIG. 5 is a cross-sectional elevational view of the regulator housing.

Referring to the drawings in greater detail, the animal lure dispenser 20 is shown in use by a hunter with lure container 30 being worn on his belt and with regulator 40 near the ground. The components of a preferred embodiment of the dispenser are best shown in FIG. 2 and include lure container 30, elongate lure flow tube 21, regulator 40 and tail flow tube 22. The preferred lure container 30 shown in FIGS. 2–4 is designed to be worn on the belt of the user and is slightly contoured to conform to the user's hip. A pair of belt loops 31 are provided on the back of container 30 for ease of mounting on the user's belt. A conventional screw cap 32 is provided at the top of the container for filling or emptying container 30. To permit liquid flow from container 30, it is necessary to provide a vent means in the upper portion of container 30. Any conventional vent means which will function to permit fluid flow and which preferably will not permit liquid to splash out of the vent means can be used. In the embodiments shown, a conventional push-pull vent 33 is incorporated in cap 32.

The liquid lure passes from container 30 into flow tube 21 through an egress means such as spout 34. Spout 34 is contoured at the bottom of container 30 to permit all of the contents of container 30 to be utilized. One end of flow tube 21, which is preferably a flexible plastic tubing such as polyethylene, fits over the end of spout 34 with an interference fit to prevent leakage. Preferably, the end of spout 34 is threaded so that when flow tube 21 is removed, it can be replaced with a threaded cap 34 (see FIG. 4) for easier transport or storage of container 30 without leakage. The length of flow tube 21 can vary according to the desire of the individual user. In general, flow tube 21 should be long enough so that regulator 40 is at or near ground level during application of the lure. Desirably, an extra long length of flow tube 21 is provided so that the user can cut it to a customized length. While flow tube 21 can be of a length to permit regulator 40 to drag on the ground during application, it is preferred to maintain regulator 40 above ground level to avoid damage to it or entanglement with weeds, brush and the like. Thus, a tail tube 22 is preferably added at the distal end of regulator 40 which can be dragged on the ground with less chance of damage or entanglement, while ensuring direct and consistent application of the lure to the ground by minimizing wind effects.

Figure 9:
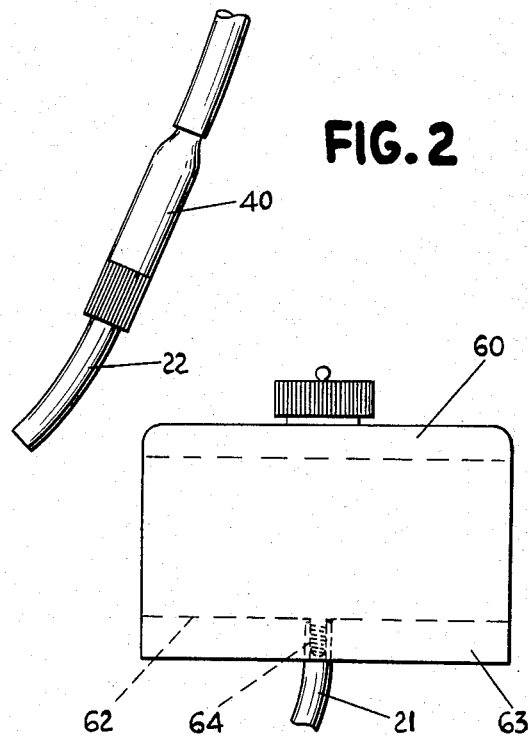
FIG. 9 is a front elevational view of one variation of the dispenser container.

A variation of container 30, container 60, is shown in FIG. 9. Container 60 is designed with a flat bottom to facilitate storage, transport or commercial display in the upright position. Thus, below bottom wall 62 of container 60 a peripheral skirt 63 is provided. A lure egress nipple 64 depends from the bottom wall 62 just short of the lower edge of skirt 63. As with spout 34, nipple 64 is preferably threaded to receive a closure cap when flow tube 21 is removed.

Figure 6:
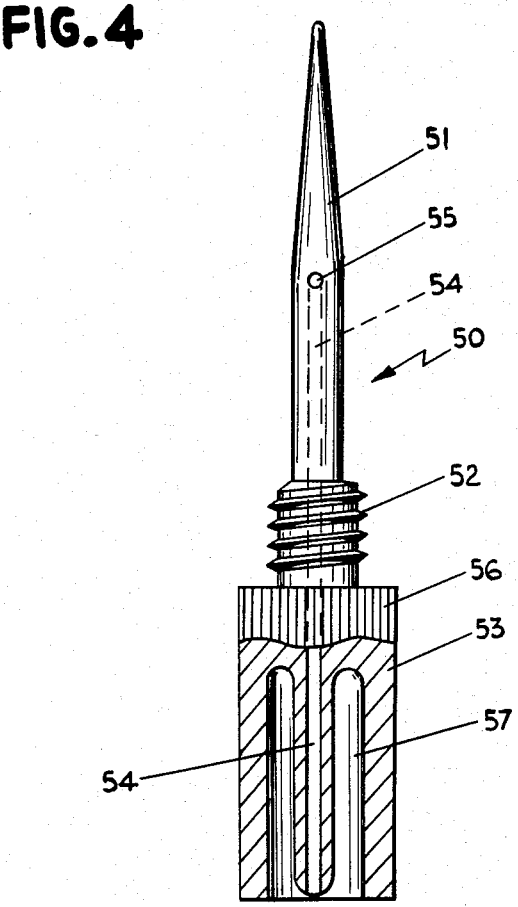
FIG. 6 is a cross-sectional elevational view of the regulator valve.

The details of the preferred regulator 40 of the present invention are best shown in FIGS. 5–8. Regulator 40 includes housing 41 (FIG. 5) and valve member 50 (FIG. 6). While members 50 and 41 can be made of a variety of materials as long as they are chemically resistant to the particular lure to be used, plastics such as high density polyethylene have proven to be preferred.

Regulator housing 41 is a generally cylindrical member with an axial bore 42 therethrough. In the design shown, the upper end of housing 41 tapers to a smaller diameter cylindrical portion 43 for sealing engagement in the distal end of flow tube 21 (see FIG. 6 and 7). End 43 should be sized just slightly larger than the internal diameter of tube 21 so a sealing interference fit is produced. Additionally, small protrusions 44 can be provided on the periphery of end 43 to provide a more secure attachment of tube 21 to end 43 and for greater resistance to accidental pull-off.

Housing bore 42 includes an upper section 45 into which the liquid lure flows from flow tube 21. At the lower end of bore section 45 is valve seat 46. Below valve seat 46 is tapered valve chamber 47 for receipt of valve 50. The lower end of the housing bore is provided with female threads for sealingly and adjustably threadably receiving valve member 50.

Valve member 50 (FIG. 6) includes a tapered needle valve end section 51, and intermediate male threaded housing engagement portion 52, which is threadably received in threaded bore 48 of housing 41, and enlarged base section 53. An axial bore 54 extends from the lower end of base section 53 to one or more side ports 55 in valve 51.

Figure 7:
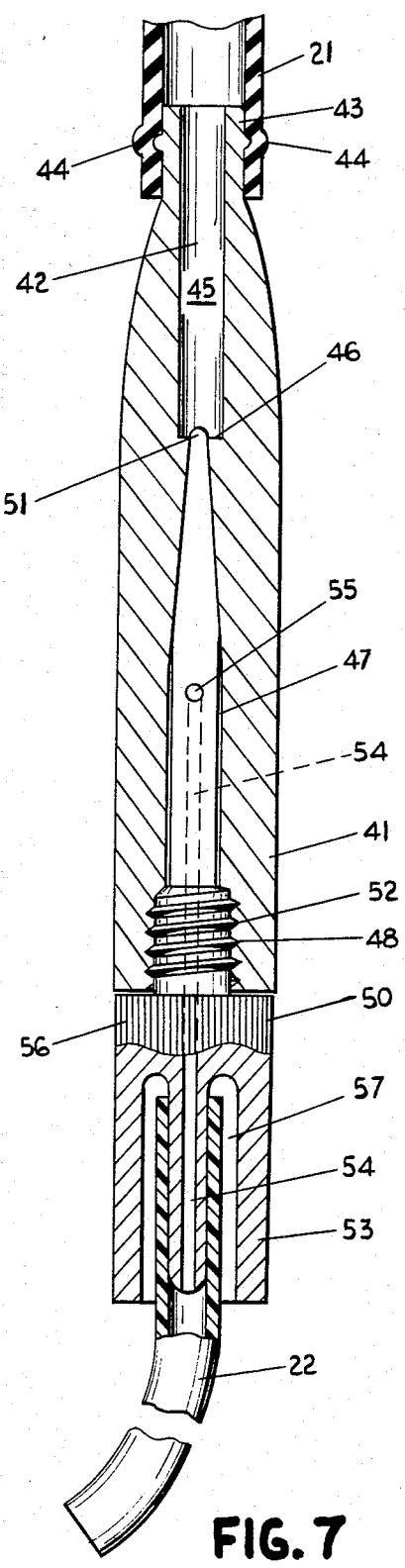
FIG. 7 is a cross-sectional elevational view of the dispenser regulator in the stopped flow setting.
Figure 8:
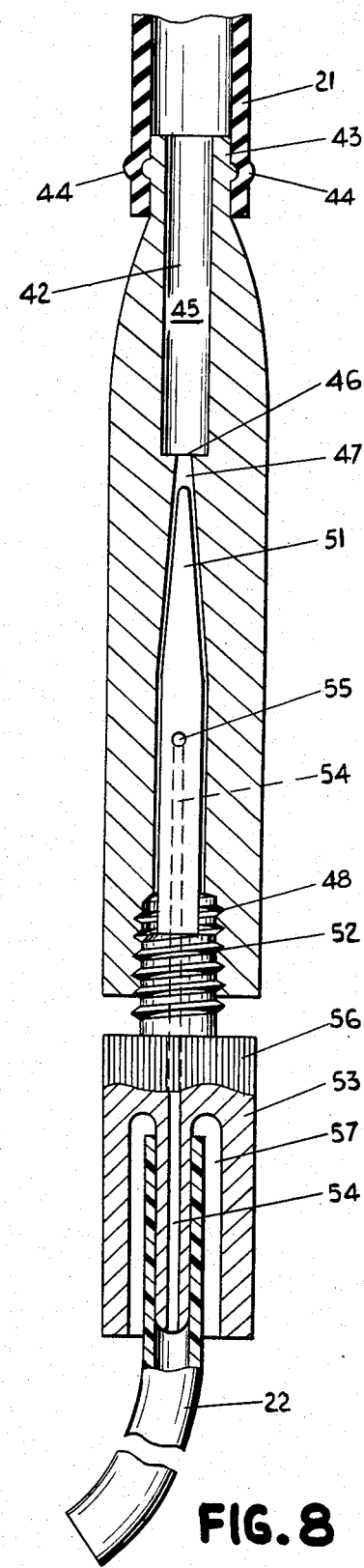
FIG. 8 is a cross-sectional elevational view of the dispenser regulator in a fixed flow setting.

When valve member 50 is installed in housing 41 with threads 52 engaged with threads 48 until the upper surface of base section 53 abuts the bottom surface of housing 41, the tip of valve 51 will be seated in valve seat 46 to a flow stopping setting where no liquid lure will flow through regulator 40. As is best shown in FIG. 7, the outside diameter of valve member 51 below the tapered end is less than the inside diameter of the lower cylindrical portion of valve bore 47 to permit liquid flow between valve 51 and the walls of bore 47 into port 55. To produce a fluid flow, valve member 50 is screwed out from housing 40 to a desired extent. Because of the tapered configuration of the end of valve 51, the more that valve 50 is unscrewed from housing 48, the more the flow of liquid lure will be increased. Thus, the user adjusts valve member 50 until the desired flow rate is produced. Although infinitely adjustable between a stopped flow condition and a full flow condition, once a flow setting is selected it will remain fixed until readjusted. Base 50 preferably has knurls 56 on the outer periphery to facilitate fine adjustments.

Optionally, a tail flow tube 22 is provided at the lower end of valve base 53. To virtually eliminate wind effects when dispensing the lure, it is desirable to dispense the lure directly on the ground. Although regulator 40 may be dragged along the ground to insure this direct application, there is the potential for entanglement in brush and the like and potential damage to regulator 40. Tail tube 22, which is less apt to be entangled or damaged, permits regulator 40 to be positioned slightly above the ground during the application procedure. In the embodiments shown, an annular bore 57 is provided in the lower portion of base 53 for receipt of the proximal end of tail tube 22. Tail tube 22 should be sized so that an interference, sealing fit is produced. Protrusions such as protrusion 44 may also be utilized in this connection to resist pull-off.

In use, the lure dispenser can be conveniently carried or transported to the application site in a compact fashion with tube 21 removed from container 30 and rolled into a coil with cap 35 on spout 34. When it is desired to apply the lure, cap 35 is removed and the proximal end of tube 22 is installed on spout 34. Valve 50 should be in the closed position at this point. Valve 50 is then adjusted outwardly from housing 41 until the desired flow rate is achieved with vent 33 opened. Regulator 40 is then permitted to hang freely with tail tube 22 dragging on the ground. The user merely walks along the desired trail confident that the pre-determined and desired amount of liquid lure is being applied. Thus, the animal liquid lure dispenser of the present invention is easy to use and automatically dispenses the lure at a fixed pre-determined rate with virtually no adverse wind effects. An important feature is that the regulator is located near the ground. Because of the length of flow tube 22 between the regulator and container 30, the pressure head does not vary greatly from when the container is filled until it is emptied. Accordingly, only a minor reduction in flow rate will be experienced as the container 30 is emptied at a given valve setting.

While the preferred embodiments of the present invention have been described and illustrated, it will be obvious to those skilled in the art that various changes and modifications can be made without departing from the spirit of the present invention. For example, simple reversal of parts should not depart from the spirit of the present invention, such as reversing the orientation of regulator 40 and attaching tube 21 to the base of valve 50 and tail tube 22 to the upper portion of housing 41. Thus, the scope of the present invention is deemed to be limited only by the appended claims.

The embodiments of the invention in which an exclusive property or privilege is claimed are defined as follows:

1. An animal lure dispenser comprising:
    a lure container having vent means in the upper portion thereof and lure egress means in the lower portion thereof and having body carrying means adapted to attach the container to the body of a person using the dispenser;
    a lure flow tube, the proximal end of said flow tube in liquid communication with said container and extending from said container lure egress means and further extending downwardly to trailing contact with the ground;
    a lure flow regulation valve in liquid flow adjusting communication with the distal end of said flow tube between a flow stopping setting and one or more flow settings for selecting a constant flow rate from said container and said lure flow tube, said regulator including a housing and a valve member in flow communication with the distal end of said lure flow tube, said housing having an axial bore and a valve seat portion and said valve member has an axial bore from one end to a point intermediate the other end and at least one side port in liquid flow communication with said valve bore and said housing bore, the other end of said valve member received in said housing bore and engageable with said valve seat portion; and
    sealing means at one end of said valve member to prevent liquid flow between said housing bore and said valve member except through said side port when said other end of said valve member is disengaged from said valve seat portion.

2. An animal lure dispenser according to claim 1 wherein said valve member is a needle valve and said valve seat portion in said housing is a needle valve seat and wherein said housing and said needle valve are threadably engaged to permit adjustment between flow stopping and one or more fixed flow settngs.

3. An animal lure dispenser in accord with claim 2 which further comprises a tail flow tube in flow communication with the distal end of said regulator.

* * * * *